Patented Apr. 19, 1932                                              1,854,435

UNITED STATES PATENT OFFICE

LAWRENCE S. WILBUR, OF EVANSTON, ILLINOIS, ASSIGNOR TO JOHNS-MANVILLE CORPORATION, A CORPORATION OF NEW YORK

PROCESS OF FINISHING BITUMINOUS CONCRETE FLOORING

No Drawing.        Application filed November 3, 1927.  Serial No. 230,762.

Bituminous concrete is usually placed, in the manufacture of floors, while the material is at a temperature around 400° F. and the finished surface is produced by rubbing with a float after a rough surface has been obtained by striking off the concrete with a straight edge or the like.

The rapidity with which the desired surface can be produced decreases as the temperature drops, unless an excess of bitumen is present, and such an excess is detrimental to the flooring. The work is usually paid for on the basis of the area finished by the workmen, and hence there has been a strong temptation to increase the bitumen content, to the detriment of the floor, in order to gain speed without enduring the high temperature necessary to proper working.

According to the improved procedure the proper finish can be obtained with appropriate rapidity while the concrete is relatively cool.

The gist of the process consists in applying a small amount of flux to the surface to be finished, and following this application immediately with vigorous application of the float.

When coloring matter has been incorporated in the concrete, or it is desired to color the surface, the flux can be used as a vehicle for the coloring matter.

Any material that will quickly cut the bitumen and will permit it to harden again in a reasonable time may be used as a flux. It may be either in the form of a liquid, a paste, a cake or flakes. A good liquid mixture may be obtained from One gallon of benzine,
4 oz. stearic acid,
Two lbs. red oxide of iron, and
1 oz. of CP ammonia, of about 26% concentration.

Melt the stearic acid, add the benzine slowly while stirring, add the oxide while continuing the stirring, and finally add the ammonia and continue the stirring until an emulsion is formed.

This mixture can be applied by means of a brush in one hand, and followed immediately by a float in the other hand.

A cake or flakes may be made of the following composition:

One pound of ceresine wax or stearic acid or bees' wax or paraffin, or any other wax that will rapidly cut the bitumen, and two pounds of red oxide of iron. Melt the wax and stir in the oxide and mold into cakes. If flakes are desired the cakes may be later subjected to a flaking operation.

When used in the form of a cake it may be applied with one hand and followed immediately with the float.

Another good mixture consists of:

1 gal. benzine or gasoline,
2 lbs. red oxide, or other coloring matter,
5 oz. stearic acid,
3 oz. ceresine wax,
1 oz. CP ammonia.

Melt the stearic acid and wax. Add benzine or gasoline, coloring and ammonia in the order named, and continue to stir until an emulsion is formed.

When coloring matter, such as red oxide of iron, is incorporated in the bitumen concrete, there is danger of having different shades in the floor due to the fact that part of the mixture remains in the boiler while a part is being laid, and therefore is subjected a longer time to the action of heat, which tends to change the shade of the color. In some instances the action of the flux, with or without additional coloring matter, will, to a large extent, restore uniformity in the shade of the floor. However, it is preferred not to put the coloring matter in the concrete, but to apply it only in the finishing operation.

The presence of a small amount of wax in the composition applied to the concrete improves the surface, because it has a tendency to form a thin skin of veneer that is relatively hard and dense as compared with the body of the asphalt; but care must be observed to avoid an excess of wax, for the harder formation has a tendency to crack when the floor is flexed or subjected to a concentrated load.

Instead of red oxide of iron other colors may be used, and it is contemplated that aniline colors will be substituted for pulverulent mineral or vegetable matter.

I claim as my invention—

1. The process of laying floors of bituminous concrete, which includes placing the concrete at a temperature around 400° Fahrenheit, striking it off, and allowing it to cool to approximately 200° Fahrenheit, then treating the surface with a small amount of flux, followed immediately by the application of a float.

2. The process of finishing bituminous concrete, consisting in laying the bituminous concrete while hot on a foundation and striking it off to produce a rough finish, then applying a small amount of flux to the rough surface of the laid concrete and immediately rubbing the surface with a float to produce the finished surface.

3. The process of finishing bituminous concrete consisting in laying the bituminous concrete while hot on a foundation and striking it off to produce a rough finish, then applying to the concrete while at a temperature of approximately 200° F., the composition including wax that will cut the bitumen, and immediately rubbing the surface with a float to produce the finished surface.

In testimony whereof I affix my signature.

LAWRENCE S. WILBUR.